(12) United States Patent
Conlin

(10) Patent No.: US 6,346,150 B1
(45) Date of Patent: *Feb. 12, 2002

(54) PAINT SPRAY BOOTH WITH ROBOT

(76) Inventor: Douglas Conlin, 737 Ambleside Dr., Wilmington, DE (US) 19808

( * ) Notice: Subject to any disclaimer, the term of this patent is extended or adjusted under 35 U.S.C. 154(b) by 0 days.

This patent is subject to a terminal disclaimer.

(21) Appl. No.: 09/307,237

(22) Filed: May 7, 1999

Related U.S. Application Data

(63) Continuation-in-part of application No. 09/100,534, filed on Jun. 19, 1998, now Pat. No. 6,082,290.

(51) Int. Cl.[7] .......................... B05B 15/12; B65D 65/02
(52) U.S. Cl. ....................................... 118/326; 118/323
(58) Field of Search ................................. 118/309, 323, 118/326, 324, 634; 427/156; 403/292, 293, 315, 338, 341; 137/377; 150/154

(56) References Cited

U.S. PATENT DOCUMENTS

| | | |
|---|---|---|
| 2,991,188 A | 7/1961 | Wing et al. |
| 3,496,856 A | 2/1970 | Wiggins |
| 3,741,155 A | 6/1973 | Hunder |
| 3,921,576 A | 11/1975 | Vertue |
| 4,207,833 A | 6/1980 | Napadow |
| 4,231,289 A | 11/1980 | Domicent |
| 4,469,595 A | 9/1984 | Napadow |
| 4,484,513 A | 11/1984 | Napadow |
| 4,484,772 A | 11/1984 | Ross, Sr. |
| 4,630,567 A | 12/1986 | Bambousek |
| 4,693,048 A | 9/1987 | Guetersloh |
| 4,748,049 A | 5/1988 | Charles et al. |
| 4,762,455 A | 8/1988 | Coughlan |
| 5,024,836 A | 6/1991 | Botsolas |
| 5,201,954 A | 4/1993 | Holt |
| 5,236,506 A | 8/1993 | Mazakas |
| 5,240,504 A | 8/1993 | Mazakas |
| 5,769,703 A | 6/1998 | Conlin |
| 6,039,068 A * | 3/2000 | Tessier et al. .............. 137/377 |

FOREIGN PATENT DOCUMENTS

| | | |
|---|---|---|
| DE | 197808 | 8/1978 |
| JP | 63-65973 | * 3/1988 |

* cited by examiner

Primary Examiner—Richard Crispino
Assistant Examiner—Yewebdar T Tadesse
(74) Attorney, Agent, or Firm—Connolly Bove Lodge & Hutz LLP

(57) ABSTRACT

A paint spray booth includes a robot having a shape retaining cover member assembly with members which interlock at the robot's axes to seal out paint while allowing a full range of motion. A flexible outer cover or shield is detachably mounted over the cover members so that after use of the paint spray booth, the outer covers may be detached and laundered for reuse.

20 Claims, 3 Drawing Sheets

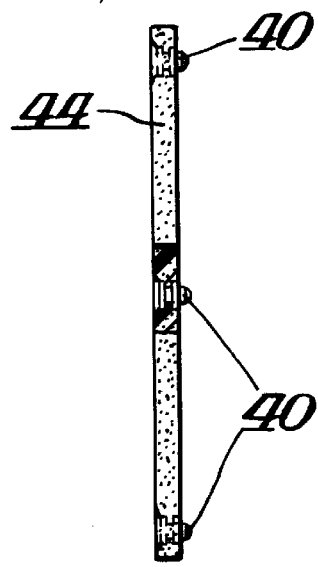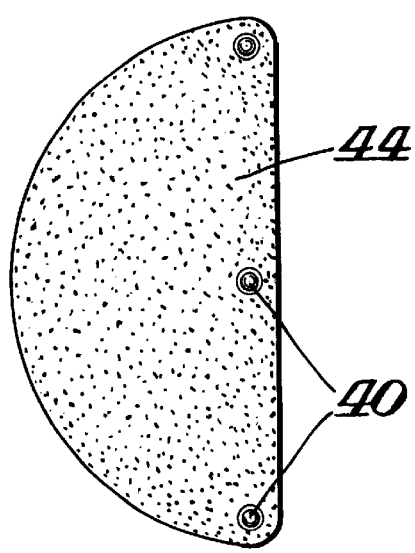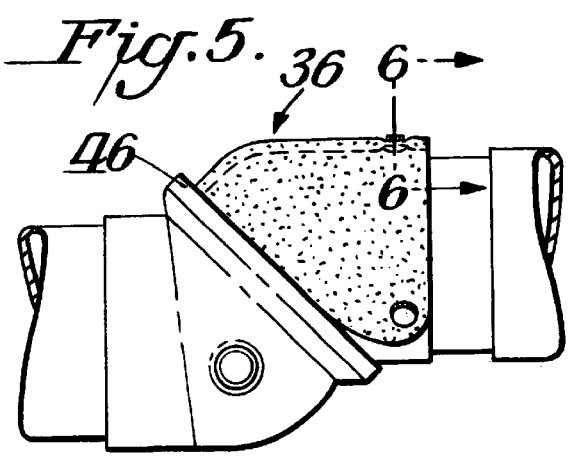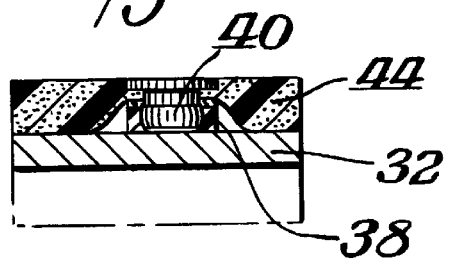

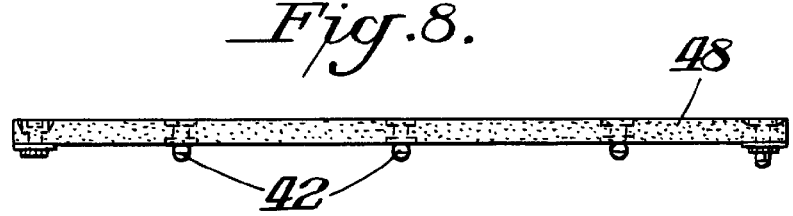
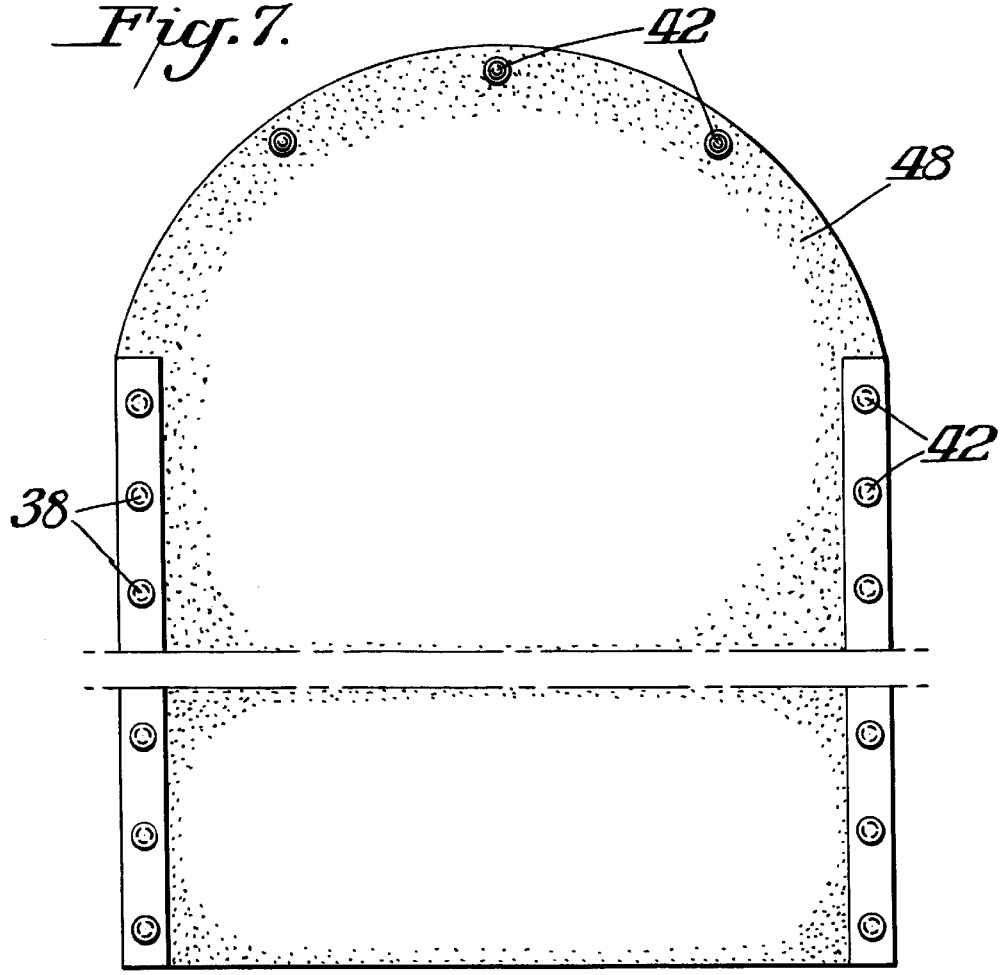
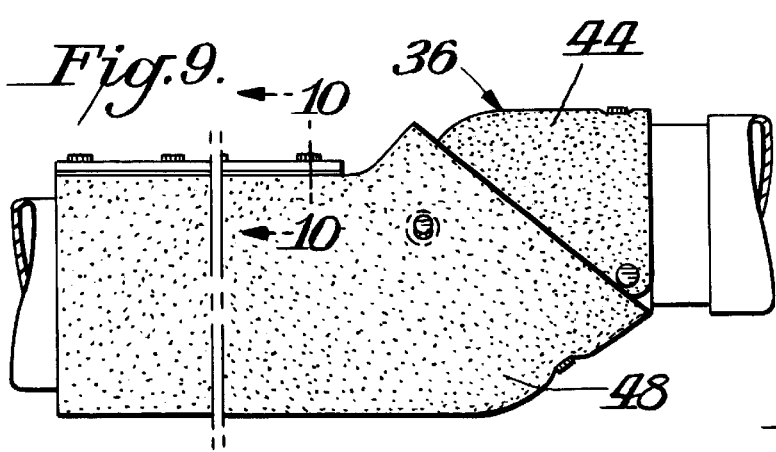
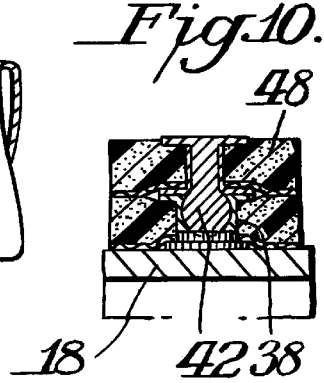

PAINT SPRAY BOOTH WITH ROBOT

Cross-Reference to Related Application

This application is a continuation in part of application Ser. No. 09/100,534, filed Jun. 19, 1998 now, U.S. Pat. No. 6,082,290.

BACKGROUND OF THE INVENTION

The present invention relates to paint spray booths and particularly to paint spray booths having robots.

Parent application Ser. No. 09/100,534 relates to improvements in paint spray booths.

Paint spray booths are used for painting various objects. A common use of such type of booth is in the automotive industry. Frequently, such booths incorporate robots as a means for applying the paint. Because the paint becomes airborne, the paint is deposited on various parts of the robot such as the wrist joint and the compressed air delivery hose. This presents a problem in particular with regard to the joint or wrist connecting the spray nozzle or gun to the robot arm. For example, at such location the movement takes place about different axes. When dry paint has accumulated on the robot, robot movement causes the dry paint to shed. The dry paint contaminates the object being painted. A further problem is that the paint mist can get into the joint at each axis and dry. When the robot twists, particles of paint are dropped.

A prior art attempt at addressing the above problem involves providing loose cloth shrouds over the two interlocking parts which form the robot wrist. While this arrangement seals each axis, it still has the problem of shedding dry paint. A further disadvantage of cloth covers is that the covers can not be cleaned while on the robot. Additionally, such cloth gives off lint.

Parent application Ser. No. 09/100,534 discloses techniques for avoiding the above problems. In general, the techniques involve providing a semi-rigid cover of multi-piece construction located at various parts of the robot, such as the robot wrist joint. The cover includes connecting structure on adjacent cover members to interlock the cover members, yet permit relative rotation of one cover member with respect to the other. Thus, the joint is protected without impeding the rotational movement of the arm. The semi-rigid material is preferably made of a non-porous plastic such as PVC which lends itself to numerous desirable characteristics for such a cover.

SUMMARY OF THE INVENTION

An object of this invention is to provide improvements in paint spray booths utilizing robots.

A further object of this invention is to provide techniques which may be used with one or more robot covers as disclosed in the parent application.

In accordance with this invention an outer shield assembly is detachably mounted over and distinct from at least one of the cover assemblies which comprise the cover members for the robot.

THE DRAWINGS

FIG. 3 is a top plan view of the inside of a joint cover or shield which may be secured to the robot arm of FIG. 2;

FIG. 4 is an end elevational view partly broken away of the joint cover or shield shown in FIG. 3;

FIG. 5 is a side elevational view showing the joint cover or shield mounted on the robot arm of FIG. 2;

FIG. 6 is a cross-sectional view taken through FIG. 5 along the line 6—6;

FIG. 7 is a plan view of an outside cover member or shield mountable on the robot arm of FIG. 2 in combination with the shield of FIG. 5;

FIG. 8 is an end elevational view of the cover or shield of FIG. 7;

FIG. 9 is a side elevational view showing the shield or cover of FIGS. 7–8 mounted on the robot arm; and FIG. 10 is a cross-sectional view taken through FIG. 9 along the line 10—10.

DETAILED DESCRIPTION

The present invention is directed to improvements in paint spray booths and is intended to be adapted for use in any type of paint spray booth. Thus, the details of the booth itself are not novel but set forth the preferred environment for use of the invention. Since such booth structure is known in the art, a detailed description of the booth structure is not necessary. Reference is made to U.S. Pat. Nos. 4,207,833, 4,231,289, 4,469,595, 4,484,513, 4,693,048, 5,201,954, 5,236,504, and 5,240,504 for exemplary paint booth structure. The details of those patents are incorporated herein by reference thereto.

Figure 1:
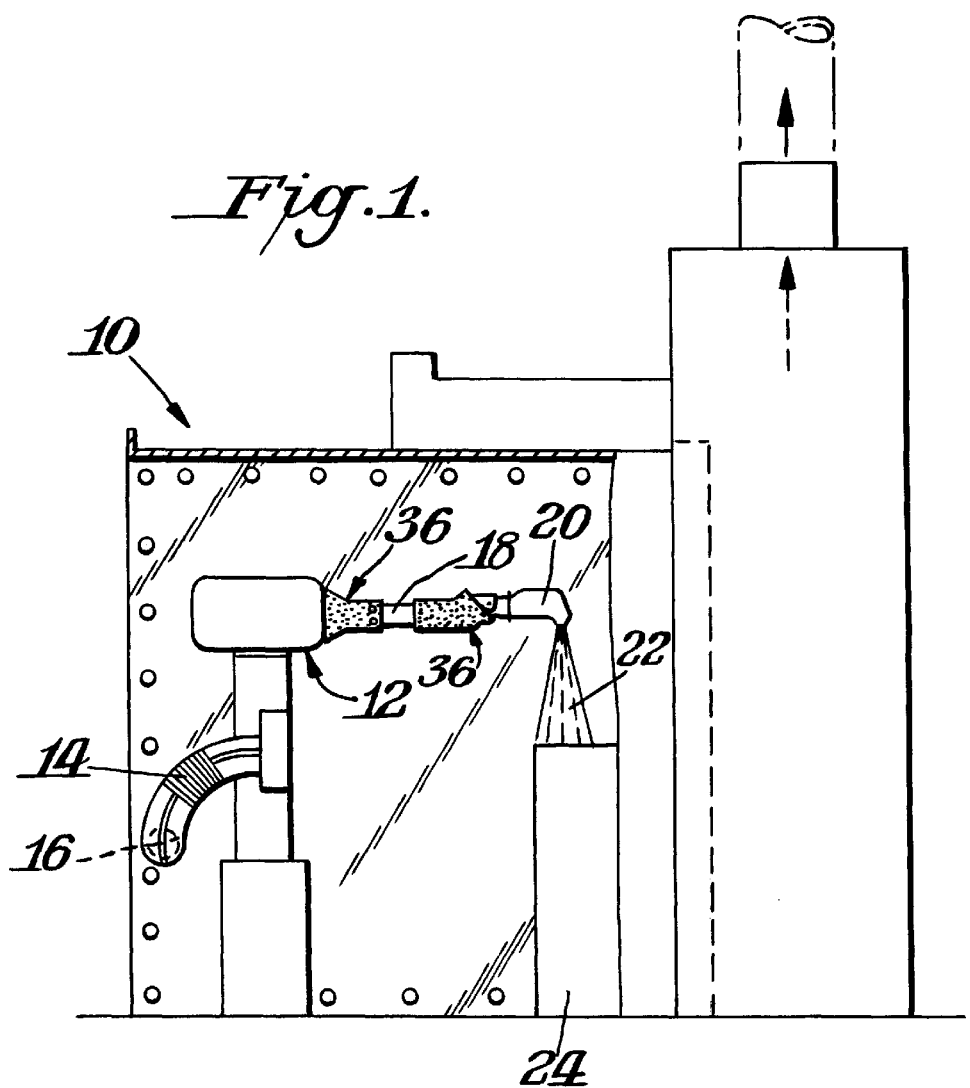
FIG. 1 is a side elevational view partly broken away showing a paint spray booth having a robot which incorporates the protective cover structure of this invention.

FIG. 1 illustrates a paint spray booth 10 which may incorporate the present invention. As shown therein the paint spray booth 10 is provided with a conventional robot 12. Robot 12 includes a paint delivery hose 14 which extends through an opening 16 in the side wall of booth 10. Additionally, robot 12 includes a robot arm 18 having a spray nozzle or gun 20 at its outer end. Nozzle 20 applies a paint spray pattern 22 on the object 24 being painted. The spray nozzle 20 is connected to arm 18 by a wrist joint which is shown in greater detail in FIGS. 2, 5 and 9.

Figure 2:
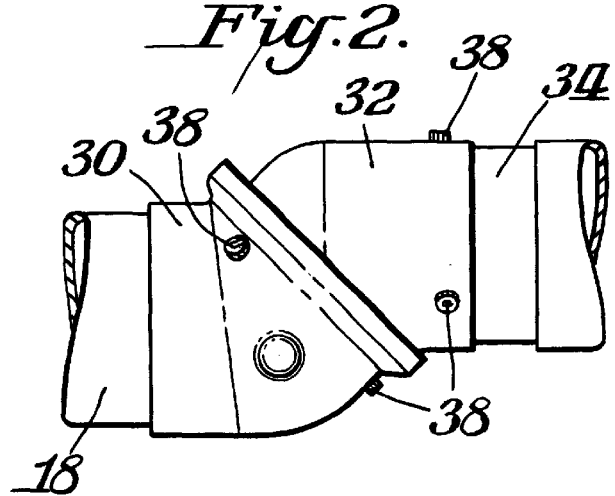
FIG. 2 is a side elevational view of a robot arm rotator joint shown in FIG. 1.

Parent application Ser. No. 09/100,534, all of the details of which are incorporated herein by reference thereto, discloses the use of a cover assembly which may be mounted at selected locations around the robot. FIG. 2, for example, illustrates the cover assembly to include a pair of cover members 30,32 mounted over a wrist joint formed by arm 18 and nozzle extension 34. The wrist joint members 18,34 are connected to rotate with respect to each other. The cover members 30,32 are made of shape retaining material and are interlocked to form a seal around the joint while permitting the adjacent members 18,34 to rotate in the manner described in the parent application.

The wrist joint is in the form of an off-set elbow having a race at an axis of rotation of the offset members. As disclosed in the parent application, preferably the cover members are made of semi-rigid material. The term semi-rigid is used to mean a material which permits the members to be spread apart thus facilitating their mounting on the irregularly shaped joint, yet, having sufficient rigidity to hold their own shape. The preferred semi-rigid material is PVC which preferably is dip molded, rather than injection molded. The PVC can vary in resistivity since it is preferred that a completely resistive material not be used in a paint spray booth. Other materials may also be used such as various injection molded plastics or even rubber where the materials are semi-rigid. Rigid or flexible materials could also be used, but shape retaining material is preferred. The material is preferably non-porous. It is preferred that the material should not contain silicon, since silicon is a paint contaminant. It is also preferred that the material be self-flame extinguishing to minimize any danger from fires.

The cover members preferably have a hardness of 40–95 Shore A durometer with a tensile strength up to 2500 psi and a tear strength up to 450 psi. The material preferably has an elongation up to 350% and is heat resistant up to 105° C. with low temperature flexing down to –40° F. The material preferably has a di-electric strength up to 600 volts/mil and is chemically resistant to acid, salts and alkalies.

The invention provides a number of distinct advantages. For example, the cover members at the wrist joint provide a more precise fit and are easy and quick to install and remove. The materials for the cover members can be conductive or insulative and should resist overspray reaction to the robot. The degree of rigidity allows the cover members to overlap and interlock so as to form seals around the various axes of rotation of the robot while keeping out contaminants. Unlike cloth covers, the preferred material for the cover members contains no fibers which can shed to cause contamination. A further advantage with the cover members for the wrist joint is that they are more economical because their production could be automated as compared to conventional cloth covers which are sewn together. The shape retaining nature of the cover members avoid flapping or flexing when the cover moves which would otherwise shake loose contaminants. Additionally, the shape retaining material permits the cover members to be perforated and inflated thus expelling compressed air to repel overspray and last longer than conventional covers. A further advantage is that the cover members can be washed by hand while on the robot, rather than requiring their removal and sending these covers to a launderer as with conventional cloth covers.

While the use of such cover members greatly enhances the use of robots in paint spray booths and the like it would also be desirable if some techniques could be provided to permit robot cover members to be removed and laundered. The present invention is particularly directed to that aspect of modifying the cover members described in the parent application. In general, the variation of the present invention involves the provision of an outer cover or shield which is secured over the cover members but which can be removed after use of the paint spray booth and then the removed outer cover or shield can be laundered. These outer cover members or shields would thus be detachably mounted to the cover members and could be provided at any suitable locations on the robot, not simply the wrist joint. Similarly, the outer cover members could be secured to and over a single inner cover member. If desired the outer shields can even be provided on portions of the robot having no cover members. Conversely, not all cover members need be provided with outer cover members or shields. FIG. 1 illustrates a plurality of exemplary locations 36 where the outer cover members are applied.

In the preferred practice of this invention the cover members and the outer covers or shields contain detachably mounted complementary locking members. FIG. 2, for example, shows the provision of a plurality of female snap members 38 on the cover members 30,32. The female snaps 38 would be engaged by male snap members 40,42 as shown in FIGS. 3–10. Although the figures illustrates snap fasteners as the detachable mounting structure it is to be understood that other types of the detachable fastening structure may be used. Examples include, VELCRO®.

FIGS. 3–4 illustrate an outer cover or shield 44 which is of a structure designed to be detachably engaged with cover member 32. As shown therein, shield 44 is generally semi-circular in shape so that it may be placed directly over cover member 32 and abut against protrusion 46 of the joint. Rotation is achieved at protrusion 46 by means of a race located under the protrusion. FIGS. 5–6 show shield 44 mounted to cover member 32 by engagement of fasteners 38,40.

FIGS. 7–8 illustrate a further outer cover or shield 48 which is designed to snugly fit over cover member 30 and protrusion 46. As shown therein shield 48 is generally rectangular in shape and then terminates in a semi-circular extension clearly illustrated in FIG. 7. With this shape the shield 48 may be detachably secured to cover member 30.

It is to be understood that the outer covers or shields may be dimensioned so as to extend outwardly beyond the underlying cover members thereby assuring the complete covering of the underlying cover members. The outer covers may also be dimensioned to overlap at their junction. If desired, the outer covers may be slidingly detachably secured together in any suitable manner which would not hamper wrist rotation.

In the preferred practice of this invention the shields or outer covers 44,48 are preferably made of an absorbent material which can be easily removed and laundered. The shields or outer covers are also preferably made of a flexible material that can readily conform to the shape of the underlying cover member and/or robot and also overlap without rubbing against other covers. This results in the formation of an absorbent seal. The outer cover assembly preferably surrounds a joint even when its underlying cover member is located displaced from the joint.

Any suitable material may be used for the flexible outer covers such as an absorbent foam. Although an absorbent material is preferred, the invention may be broadly practiced where the flexible outer covers are made of non-absorbent material such as polyethylene or the various materials referred to in the parent application as being usable for the protective curtains or barriers.

Although the invention has been particularly described with respect to paint spray booths, the invention may be practiced with other devices particularly with regard to providing cover members which shield a moveable joint to prevent contamination from entering the joint. While the normal movement addressed by the present invention is rotational movement, the invention may also be practiced with other types of movements such as longitudinal telescopic movement where a shielding is desired at the joint of the moving parts. Such shielding could be achieved from the inner shape retaining covers and/or the outer flexible covers. Securement to the moving members would preferably be by suitable longitudinal sliding seals such as from a downward projection into an elongated slot.

What is claimed is:

1. A combination robot and cover assembly comprising a robot having a plurality of spaced sets of adjacent members, said adjacent members in each set being connected together by a joint which permits said adjacent members to move with respect to each other, a cover assembly located over and around said joint for at least one of said sets of adjacent members, each cover assembly including at least two cover members made of shape retaining material, said cover members being of non-bellows formation and made of a material which is semi-rigid or rigid to minimize collection of paint on and flaking of paint off said cover members when said robot is used in a paint spray booth, said cover members being interlocked to form a seal around said joint while permitting said adjacent members to move with respect to each other, and an outer shield assembly detachably mounted over and distinct from said cover assembly.

2. The assembly of claim 1 wherein said outer shield assembly is made of flexible material.

3. The assembly of claim 2 wherein said outer shield assembly is made of absorbent material.

4. The assembly of claim 3 wherein said outer shield assembly includes a plurality of outer cover members.

5. The assembly of claim 4 wherein there are a plurality of said cover assemblies with an outer shield assembly detachably mounted over each of said cover assemblies.

6. The assembly member of claim 1 wherein said cover assembly is located at an offset elbow joint of said robot having rotatable adjacent members, and said outer shield assembly comprising a pair of outer shield members.

7. A combination robot and cover assembly comprising a robot having a plurality of spaced sets of adjacent members, said adjacent members in each set being connected together by a joint which permits said adjacent members to move with respect to each other, a cover assembly located over and around said joint for at least one of said sets of adjacent members, each cover assembly including at least two cover members made of shape retaining material, said cover members being interlocked to form a seal around said joint while permitting said adjacent members to move with respect to each other, an outer shield assembly detachably mounted over and distinct from said cover assembly, said cover assembly being located at an offset elbow joint of said robot having rotatable adjacent members, and said outer shield assembly comprising a pair of outer shield members, and said pair of outer shield members comprising a semi-circular member and a rectangular member having a semi-circular extension.

8. The assembly member of claim 1 wherein said cover members are made of non-porous and non-perforated material.

9. The assembly member of claim 8 wherein said cover members are molded of semi-rigid material.

10. A combination robot and cover assembly comprising a robot having a plurality of spaced sets of adjacent members, said adjacent members in each set being connected together by a joint which permits said adjacent members to move with respect to each other, a cover assembly located over and around at least one of said adjacent members, each cover assembly including at least one cover member made of shape retaining material, said cover members being of non-bellows formation and made of a material which is semi-rigid or rigid to minimize collection of paint on and flaking of paint off said cover members when said robot is used in a paint spray booth, an outer shield assembly, and said outer shield assembly is made of an absorbent material.

11. The assembly of claim 10 wherein said outer shield assembly is made of flexible material.

12. The assembly of claim 11 wherein said outer shield assembly includes a plurality of outer cover members.

13. The assembly of claim 12 wherein there are a plurality of said cover assemblies with an outer shield assembly detachably mounted over each of said cover assemblies.

14. The assembly member of claim 10 wherein said cover assembly is located at an offset elbow joint of said robot having rotatable adjacent members, and said outer shield assembly comprising a pair of outer shield members.

15. A combination robot and cover assembly comprising a robot having a plurality of spaced sets of adjacent members, said adjacent members in each set being connected together by a joint which permits said adjacent members to move with respect to each other, a cover assembly located over and around at least one of said adjacent members, each cover assembly including at least one cover member made of shape retaining material, and an outer shield assembly, and said outer shield assembly is made of an absorbent material said cover assembly being located at an offset elbow joint of said robot having rotatable adjacent members, and said outer shield assembly comprising a pair of outer shield members, and said pair of outer shield members comprising a semi-circular member and a rectangular member having a semi-circular extension.

16. The assembly member of claim 10 wherein said cover members are made of non-porous and non-perforated material.

17. The assembly member of claim 16 wherein said cover members are molded of semi-rigid material.

18. The assembly of claim 10 wherein said outer shield assembly is located around said joint.

19. The assembly of claim 14 wherein said robot and cover assembly are mounted in a paint spray booth, and said robot including a paint delivery hose and a spray gun.

20. The assembly of claim 1 wherein said robot and cover assembly are mounted in a paint spray booth, and said robot including a paint delivery hose and a spray gun.

* * * * *